United States Patent [19]

Kaneko

[11] Patent Number: 4,575,024
[45] Date of Patent: Mar. 11, 1986

[54] FISHING REEL WITH SHAFT SUPPORTED AT BOTH ENDS

[75] Inventor: Kyoichi Kaneko, Tokyo, Japan

[73] Assignee: Daiwa Seiko Inc., Higashikurume, Japan

[21] Appl. No.: 591,793

[22] Filed: Mar. 21, 1984

[30] Foreign Application Priority Data

Apr. 13, 1983 [JP] Japan .................................. 58-64702

[51] Int. Cl.[4] ............................................. A01K 89/02
[52] U.S. Cl. .......................................... 242/218; 242/220
[58] Field of Search ............... 242/211, 212, 213, 214, 242/216, 217, 218, 219, 220, 221, 84.53, 84.2 A, 84.5 R, 84.61 R

[56] References Cited

U.S. PATENT DOCUMENTS

| | | | |
|---|---|---|---|
| 1,939,148 | 12/1933 | Spenny | 242/220 |
| 2,390,356 | 12/1942 | Dileo | 242/84.53 |
| 2,984,433 | 5/1961 | Clark | 242/213 |
| 3,268,182 | 8/1966 | Clark | 242/221 |
| 3,796,395 | 3/1974 | Rankin, Jr. | 242/212 |
| 4,003,270 | 1/1977 | Moosberg | 242/211 |
| 4,168,812 | 9/1979 | Karlsson | 242/220 |
| 4,281,808 | 8/1981 | Noda | 242/218 |
| 4,456,194 | 6/1984 | Noda | 242/84.2 A |

FOREIGN PATENT DOCUMENTS 57-22638  2/1982  Japan .

Primary Examiner—Billy S. Taylor
Attorney, Agent, or Firm—Browdy and Neimark

[57] ABSTRACT

A fishing reel housing has opposed side plates between which a spool rotates to unwind line in a forward direction. A crank operated drive in one of the side plates is manually rotated to rotate the spool to rewind the line. This drive includes a friction coupling, gearing, and positive clutch between the gearing and spool. The positive clutch is disengaged by depressing a thumb member extending between and slidably mounted in slots in the side plates rearwardly of the spool. Depression of the thumb member operates linkage internal of the one side plate to disengage the positive clutch so that the spool may rotate freely in the unwinding direction. The clutch is reengaged by rotation of the crank operate drive which includes an means to release the clutch for reengagement with the spool so that continued rotation of the crank can rewind the line. The thumb member has a rear arcuate surface generally conforming to the rear edges of the side plates.

3 Claims, 14 Drawing Figures

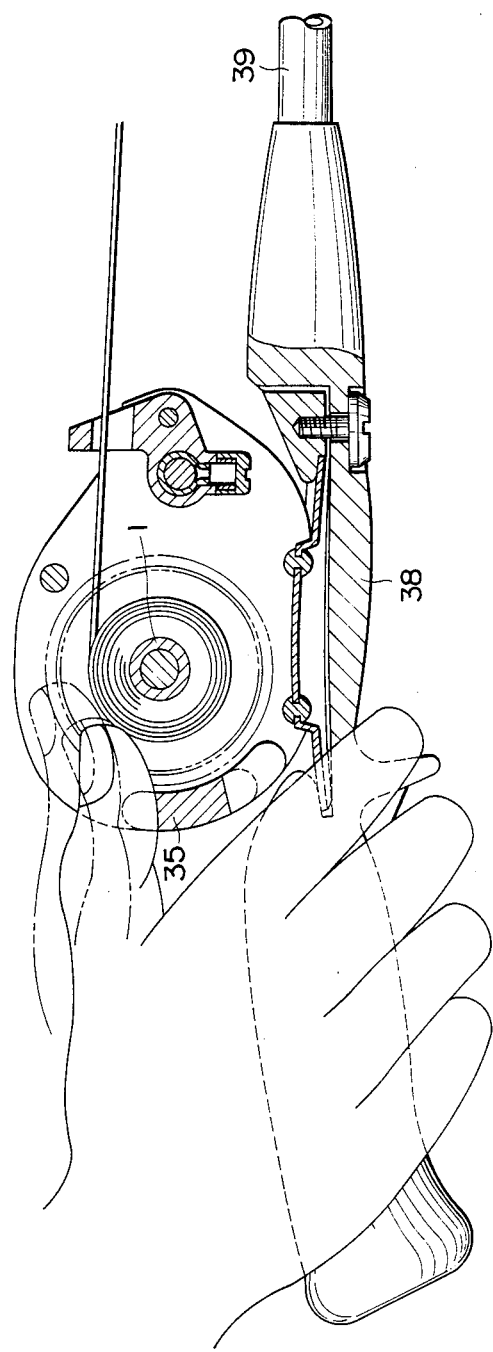

FISHING REEL WITH SHAFT SUPPORTED AT BOTH ENDS

TECHNICAL FIELD

The present invention relates to a fishing reel in which both ends of the reel are supported, and more particularly to a fishing reel of this kind which is improved to enable a continuous and smooth clutch operation, and the thumbing of the casting reel.

BACKGROUND PRIOR ART

In a conventional casting reel for lure fishing in which a casting bundle is provided on the base portion of the fishing rod and a bait-casting reel is mounted, a thumb-retaining member for operating a clutch which can rotate freely is provided so as to extend transversely between reel side plates behind the spool. In operation, the thumb-retaining member is pushed so that it rotates downwards by the thumb of the hand holding the handle to disengage the clutch mechanism, while the tip of the thumb thumbs the flange surface of the spool. Examples of such a casting reel are disclosed in, for example, the specifications of U.S. Pat. Nos. 4,168,812 and 4,142,694, as well as in Japanese Patent Laid-Open Publication No. 22638/1982.

In these known devices, however, the thumb-retaining member is rotatably supported by its front end portion and has a tongue-shaped lever portion behind the pivot shaft which is pushed downward by the shaft of the thumb to disengage the clutch, as shown in FIG. 14. During this operation the tip of the thumb is raised and separated from the spool flange. Consequently, the thumbing of the spool flange, which must be done concurrently with the clutch manipulation and which requires a smooth and delicate action of the thumb, is often impossible because the fisher is obliged to move his thumb in an unnatural manner. Consequently, problems are often encountered such as the backlash of the fishing line, casting of the lure to a point far from the target, etc. In addition, the user feels fatigue and, at worst, pain in his thumb as a result of repeated operations. These problems are serious, particularly for beginners.

The specification of U.S. Pat. No. 842,551 discloses a construction in which a clutch operation lever is rotatably mounted on one side portion of a support shaft extending between a pair of reel side plates, the clutch operation lever having a free end which extends to a position above the center of the support shaft. In this arrangement, since the operation lever is swung around the axis of a pivot by the pressure of the thumb, it is difficult to effect smooth thumbing by the tip of the thumb on the spool flange. In addition, only the central portion of the area behind the spool is available for manipulation, and the slackened fishing line tends to become entangled with the operation lever, resulting in a abrupt stopping of the release of the fishing line or, in the worst case, the breakage of the fishing line.

In these known arrangements, it is necessary to continue pressing the operation lever during thumbing, because the operation lever is urged upward. This is inconvenient and unsuitable for thumbing which must be done delicately in accordance with the fishing conditions.

SUMMARY OF THE INVENTION

Accordingly, it is a primary object of the present invention to solve these problems of the prior art.

According to a first feature of the present invention, a fishing reel is provided in which both ends of the shaft is supported, and in which the whole of a clutch operating, thumb-retaining member, provided behind the spool and adapted to disengage the clutch, is arranged so that it can be slid downward without causing any rotation or inclination of a thumb-retaining surface thereof so that, when the thumb-retaining member is pressed by the shaft of the thumb, the tip of the thumb is naturally brought to a position on the spool flange to enable the thumbing of the spool flange. This construction makes the operations of disengaging the clutch and delicately thumbing the spool compatible, so that the fisher can effect the thumbing smoothly and delicately.

According to a second feature of the present invention, a fishing reel is provided in which both ends of the shaft are supported, and in which a thumb-retaining surface of a thumb-retaining member has a constant configuration over substantially the entire length of the spool, so that the clutch and thumbing operations can be conducted stably, regardless of the position of the thumb on the thumb-retaining surface. Thus, the fisher can operate the fishing rod while gripping the handle in the manner which suits him best, irrespective of the size of his hand holding the handle and the position of his thumb. This construction ensures that the thumb of the user is not fatigued, which is inevitable in the conventional device when the operation is repeated frequently. With this construction, therefore, even a beginner can manipulate the fishing reel easily and smoothly.

According to a third feature of the present invention, a fishing reel is provided in which both ends of the shaft are supported and in which the thumb-retaining member for operating the clutch mechanism holds the clutch mechanism disengaged after the pressing operation, and the resetting of the clutch to the engaged position and the return of the thumb-retaining member are effected by the rotation of the handle shaft. Consequently, the fisher can concentrate on thumbing once the clutch has been operated. Therefore, the fisher can perform a delicate thumbing operation with the tip of his thumb to effect an adequate braking of the spool in accordance with the fishing conditions.

BRIEF DESCRIPTION OF THE DRAWINGS

FIG. 8 is a partly cut-away front elevation of the fishing reel of the present invention in use;

DETAILED DESCRIPTION OF THE PREFERRED EMBODIMENTS

Figure 1:
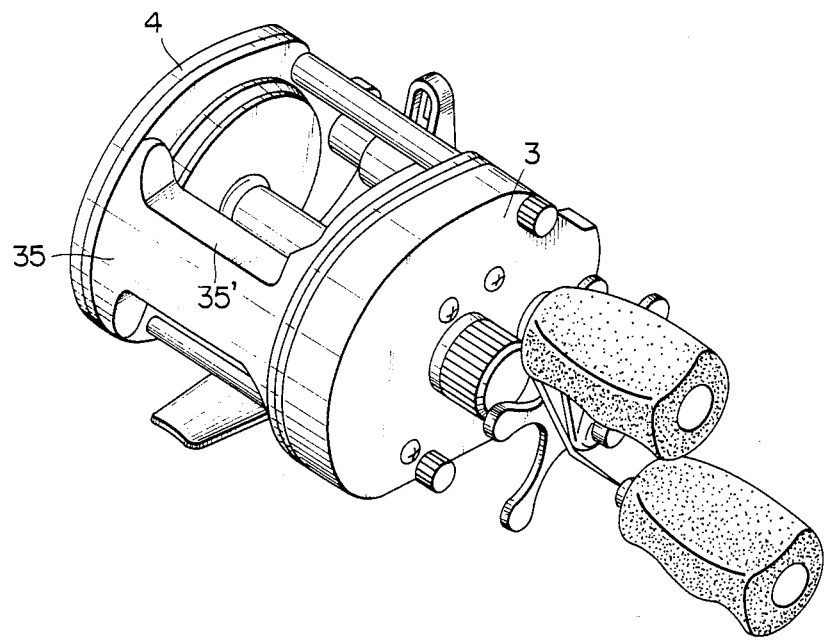
FIG. 1 is a perspective view of a fishing reel in accordance with the present invention.
Figure 2:
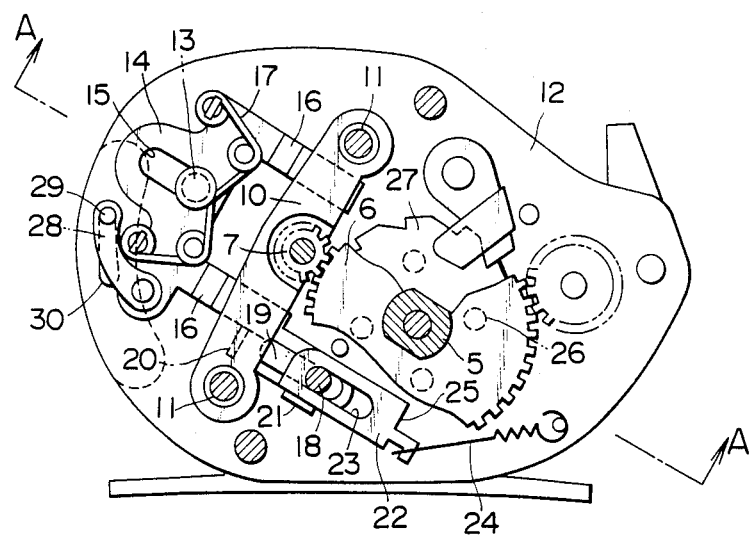
FIG. 2 is a partly cut-away front elevation of the fishing reel of the present invention with the clutch thereof engaged and with the cover of the reel side plate thereof removed.
Figure 3:
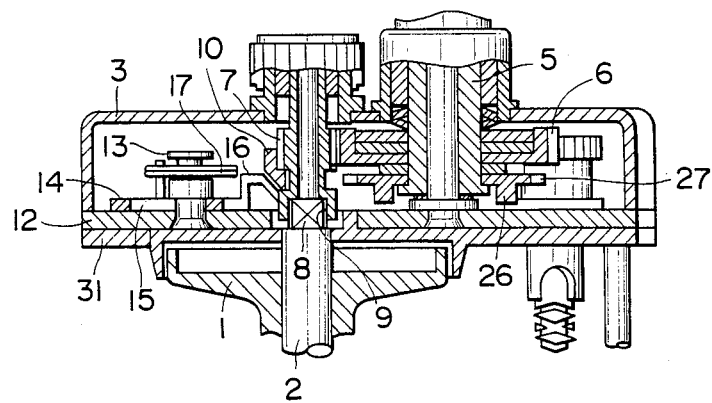
FIG. 3 is a section taken along the line A—A of FIG. 2.
Figure 4:
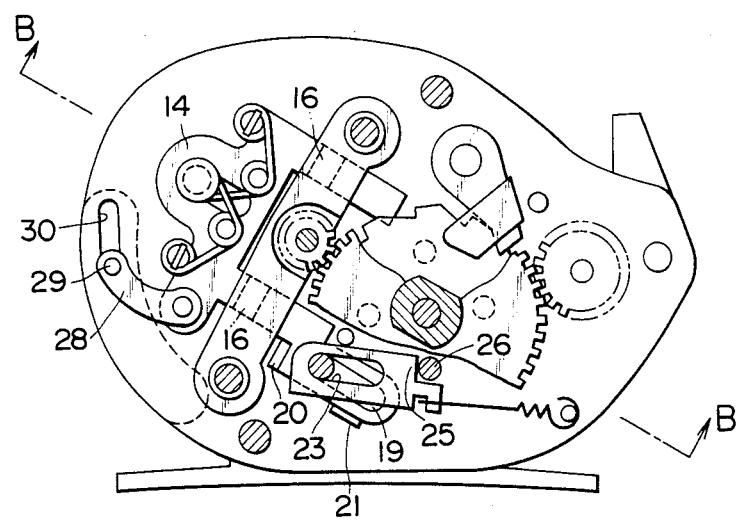
FIG. 4 is a partly cut-away front elevation of the fishing reel of the present invention with the clutch disengaged and with the cover of the reel side plate removed.
Figure 5:
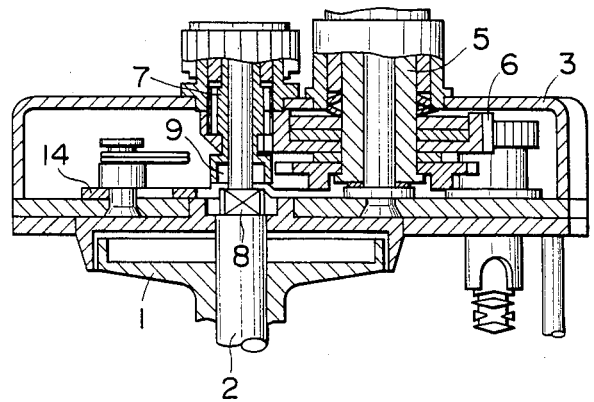
FIG. 5 is a section taken along the line B—B of FIG. 4.
Figure 6:
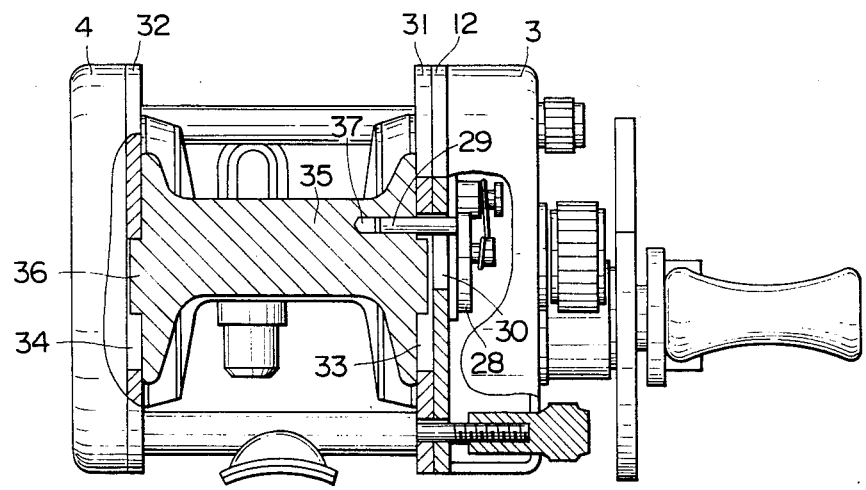
FIG. 6 is a partly cut-away side elevation of the fishing reel of the present invention.
Figure 7:
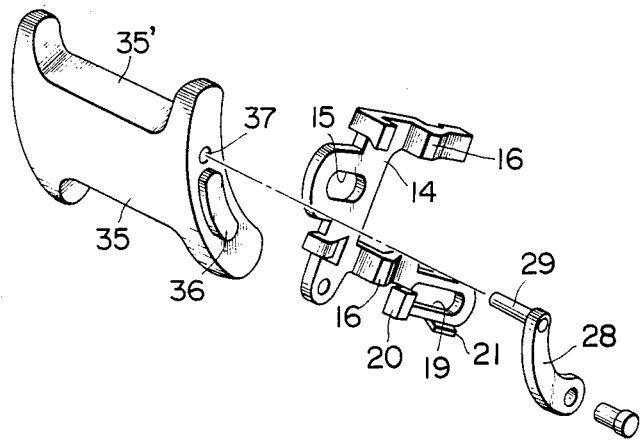
FIG. 7 is an exploded perspective view of an essential part of the fishing reel of the present invention.

Referring to the drawings, a spool shaft 2 carrying a spool 1 is held by two reel side plates 3 and 4 facing each other. As can be seen from FIGS. 2 to 4, one of the side plates (3) houses a spool shaft driving mechanism and a clutch mechanism.

More specifically, a driving gear 6 carried by a handle shaft 5 meshes with a pinion 7 which is slidably carried on the spool shaft 2. When a line (not shown) wound on the spool is released, the line moves forward substantially perpendicular to the longitudinal axis of the spool shaft as the spool shaft rotates about a central longitudinal axis. The pinion 7 is provided with a coupling recess 9 which can engage with an engagement portion 8 of the spool shaft 2, and is engaged by an engagement plate 10. The engagement plate 10 is biased by springs 11 on both sides thereof, such that the coupling recess 9 in the pinion 7 engages with the engagement portion 8.

A guide pin 13 projecting from an inner frame 12 of the reel side plate 3 is slidably received by an elongated hole 15 formed in a clutch plate 14. The clutch plate 14 has bufurcate operating projections 16 which can move into and out of the inner side surface of the engagement plate 10. The construction thereof is such that, when the clutch plate 14 is slid inward along the elongated hole 15, the operating projections 16 act to bias the engagement plate 10 outward against the force of the springs 11 to disengage the pinion 7 from the spool shaft 2.

A substantially W-shaped dead-point spring 17 is provided between two shoulders of the clutch plate 14 and the guide pin 13 so that it can either urge the clutch plate 14 to an inward sliding position or to an outward sliding position. One of the bifurcate ends of the clutch plate 14 is elongated and an elongated slot 19 for receiving a pin 18 projecting from the inner frame 12 is formed in that elongated end of the clutch plate 14. Protrusions 20 and 21 are formed on the base and the outer side, respectively, of the elongated end of the clutch plate 14.

An actuation piece 22 has an elongated slot 23 which receives the pin 18 so that the actuating piece 22 overlaps the elongated end of the clutch plate 14. One end of the actuation piece 22 is pulled by a spring 24. A retaining portion 25 is formed on this end of the actuation piece 22.

A ratchet wheel 27 provided with a plurality of kick pins 26 is fixed to the end of the handle shaft 5. The construction thereof is such that, as the handle shaft 5 is rotated with the clutch plate 14 positioned at its inward sliding position, i.e. with the spool shaft able to rotate freely, the kick pins 26 engage with the retaining portion 25 of the actuation piece 22 to force it to move so that the end of the actuation piece 22 pushes the protrusion 20 on the clutch plate 14 to urge the clutch plate 14 beyond the dead point of the dead-point spring, and reset the clutch plate 14 to the outward sliding position, i.e. to reset the clutch to an engaged state.

An engagement pin 29 is provided on the end of a connecting arm 28 attached to the shoulder on one side of the clutch plate 14. The engagement pin 29 extends through an arcuate slot 30 formed in the inner frame 12 and projects at the rear of the spool 1.

Substantially arcuate guide slots 33, 34 are formed in the rear portions of frame base plates 31, 32 at the inner sides of the reel side plates 3 and 4, respectively. The arc defined by each of the guide slots 33 and 34, forms part of a cylinder which has, as its central longitudinal axis, the rotational axis of the spool shaft 2. The guide slots 33 and 34 receive guide projections 36 on a thumb-retaining member 35 in such a manner that the guide projections 36 can slide therein substantially vertically. At the same time, the engagement pin 29 fits into an engagement hole 37 formed in a side portion of the thumb-retaining member 35 adjacent to the reel side plate 3.

The upper surface of the thumb-retaining member 35 constitutes a thumb-retaining surface 35' which extends over the entire width of the spool and which retains the thumb of the user. The outer side surface of the thumb-retaining member 35 has a configuration which substantially conforms with the rear edges of the reel side plates 3 and 4. Reference numeral 38 designates a casting handle, while numeral 39 denotes a fishing rod.

The fishing reel of the present invention with the construction described above operates in a manner explained hereinunder. When casting, the fisher grips the casting handle in his hand and presses the thumb-retaining surface 35' of the thumb-retaining member 35 downward along the arc defined by the guide slots 33 and 34 with the shaft of his thumb, so that the clutch plate 14 is pushed from its outward sliding position of FIG. 2 to its inward sliding position of FIG. 4 by the engagement pin 29 and the connecting arm 28. As a result, the spool shaft 2 and the pinion 7 are separated from each other and, at the same time, the actuation piece 22 is pulled by the spring 24 to bring the retaining portion 25 into the locus of the movement of the kick pins 26, so that the clutch mechanism is disengaged. After disengaging the clutch, the tip of the thumb is ready to thumb the spool flange, without necessitating any change of posture of the thumb.

As the handle shaft 5 is rotated in the direction in which the finishing line is taken up, the kick pins 26 of the ratchet wheel 28 engage with the retaining portion 25 off the actuation piece 22 to press it, thereby resetting the clutch plate 14 to its outward sliding position. Meanwhile, the actuation piece 22 is moved by the protrusion 21 to a position out of the rotational locus of the kick pins 26, so that the spool shaft 2 and the pinion 7 are coupled to each other to enable the winding of the finishing line onto the spool 1.

Figure 9:
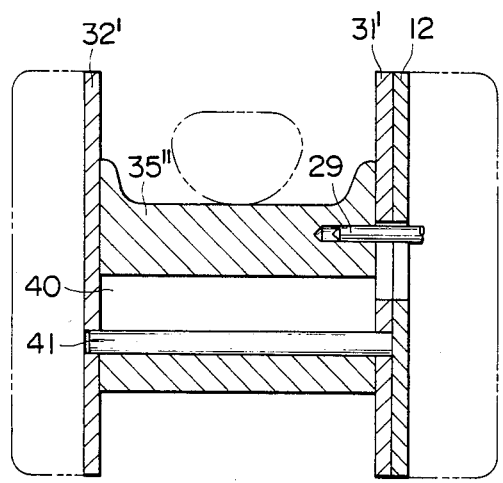
FIG. 9 is a vertical section through another embodiment.
Figure 10:
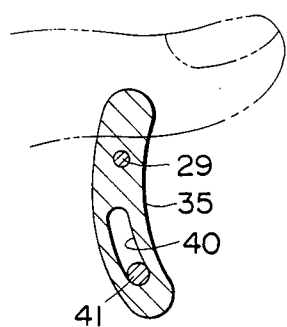
FIG. 10 is a vertically sectioned front elevation of the embodiment of FIG. 9.

FIG. 9 and 10 show another embodiment of the present invention in which a guide rod 41 provided between the frame base plates 31' and 32' is received by an elongated guide hole 40 formed in the thumb-retaining member 35" so that the thumb-retaining member 35" can move up and down.

Figure 11:
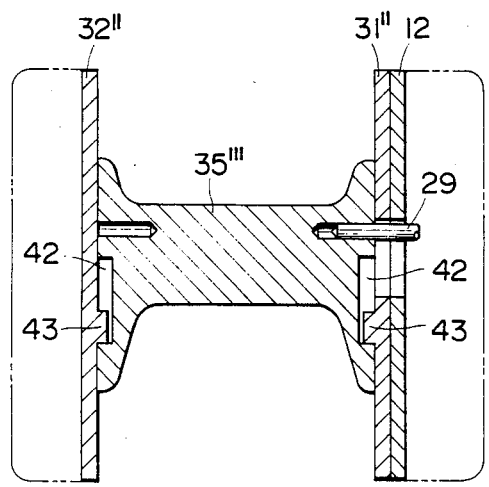
FIG. 11 is a vertically sectioned side elevation of a third embodiment of the present invention.
Figure 12:
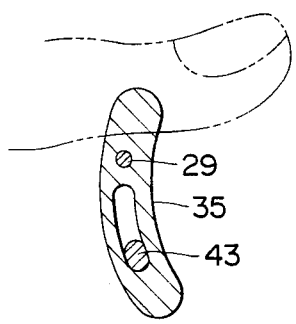
FIG. 12 is a vertically sectioned front elevation of the embodiment of FIG. 11.
Figure 14:
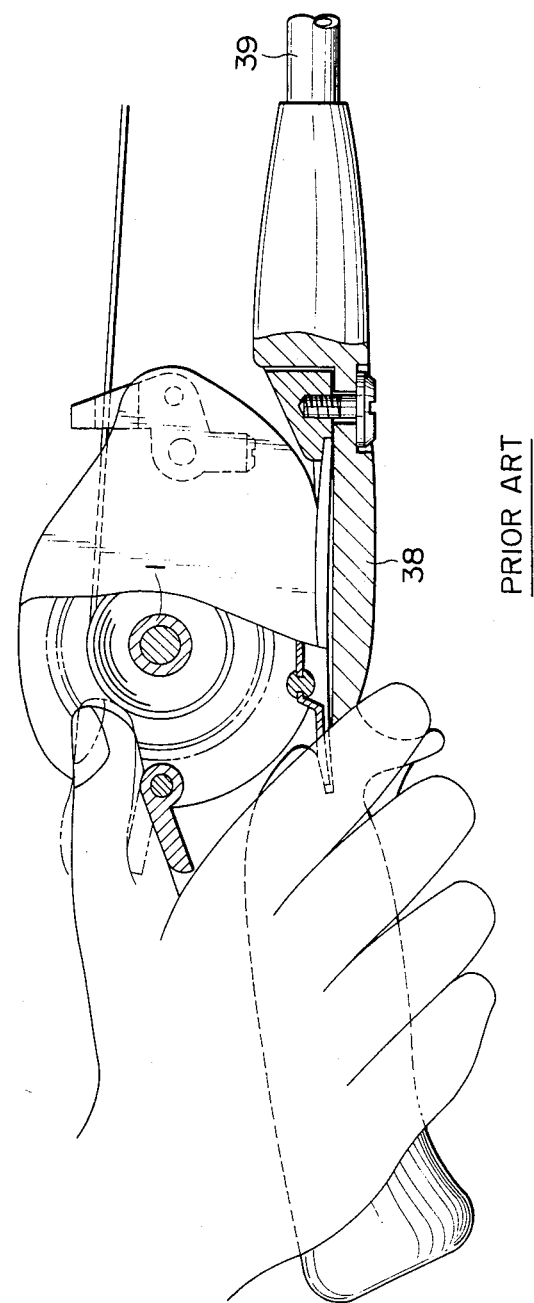
FIG. 14 is a partly cut-away front elevation of a conventional reel device in use.

It still another embodiment shown in FIGS. 11 and 12, elongated guide grooves 42 are formed in portions on either side of the thumb-retaining member 35 so as to receive guide projections 43 formed in the frame base plates 31" and 32", so as to enable the thumb-retaining member 35''' to be move freely downward.

Figure 13:
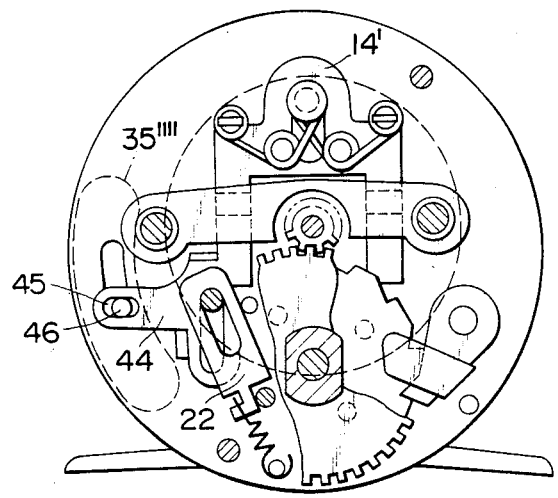
FIG. 13 is a partly cut-away front elevation of a fourth embodiment of the present invention, with the clutch thereof disengaged and with the cover of the reel side plate thereof removed.

FIG. 13 shows a further embodiment in which a projection 44 is formed as unitarily with one of the legs of the bifurcate clutch plate 14'. A pin 46 projecting from the thumb-retaining member 35'''' is received by a hole 45 formed in the projection 44, so that the clutch plate 14' and the thumb-retaining member 35'''' are connected directly to each other.

I claim:

1. In a fishing reel comprising a spool shaft carrying a spool supported between opposite side plates, said spool being adapted for the winding of a line thereon and the release of said line in a forward direction substantially perpendicular to a longitudinal axis of said spool shaft, said spool shaft having a central longitudinal axis defining a rotational axis, a power-transmitting mechanism provided in one of said side plates which is adapted to transmit the power of a handle shaft to said spool shaft, a clutch mechanism provided in said power-transmitting mechanism which is adapted to selectively transmit said power of said spool shaft, and a thumb-retaining member provided between said side plates at the rear side of said spool which is adapted to disengage said clutch mechanism to allow the free rotation of said spool shaft about said rotational axis, wherein the improvement comprises a guide means causing the whole of said thumb-retaining member to move along an arc of a cylinder having, as its central longitudinal axis, the rotational axis of said spool shaft, when said thumb-retaining member is downward, the upper surface of said thumb-retaining member constituting a thumb-retaining surface said thumb-retaining surface of said thumb-retaining member being arranged over substantially the entire width of said spool and in the vicinity of spool flanges, and a rear surface of said thumb-retaining member having an arcuate configuration substantially conforming with the rear edges of said side plates.

2. In a fishing reel comprising a spool shaft carrying a spool supported between opposite side plates, said spool being adapted for the winding of a line thereon and the release of said line in a forward direction substantially perpendicular to a longitudinal axis of said spool shaft, said spool shaft having a central longitudinal axis defining a rotational axis, a power-transmitting mechanism provided in one of said side plates which is adapted to transmit the power of a handle shaft to said spool shaft, a clutch mechanism provided in said power-transmitting mechanism which is adapted to selectively transmit said power to said spool shaft, and a thumb-retaining member provided between said side plates at the rear side of said spool which is adapted to disengage said clutch mechanism to allow the free rotation of said spool shaft, about said rotational axis, wherein the improvement comprises a guide means for causing the whole of said thumb-retaining member to move along an arc of a cylinder having, as its central longitudinal axis the rotational axis, of said spool shaft, when said thumb-retaining member is pressed from an initial position so as to slide downward, the upper surface of said thumb-retaining member constituting a thumb-retaining surface, and said clutch mechanism being provided with a first holding means which operates in response to the downward motion of said thumb-retaining member to set said clutch mechanism to a disengaged position, a second means for holding said thumb-retaining member in the downward position, a means responsive to the rotation of said handle shaft for releasing the first holding means to reset said clutch mechanism into a power-transmitting state and a means responsive to the rotation of said handle shaft for releasing said thumb-retaining member from the downward position to said initial position.

3. A fishing reel in which both ends of a shaft are supported, as set forth in claim 2, wherein said thumb-retaining surface of said thumb-retaining member is arranged over substantially the entire width of said spool and in the vicinity of spool flanges, and a rear surface of said thumb-retaining member has an arcuate configuration substantially conforming with the rear edges of said side plates.

* * * * *